(12) United States Patent
Francke

(10) Patent No.: US 6,476,397 B1
(45) Date of Patent: Nov. 5, 2002

(54) DETECTOR AND METHOD FOR DETECTION OF IONIZING RADIATION

(75) Inventor: Tom Francke, Sollentuna (SE)

(73) Assignee: XCounter AB, Danderyd (SE)

( * ) Notice: Subject to any disclaimer, the term of this patent is extended or adjusted under 35 U.S.C. 154(b) by 0 days.

(21) Appl. No.: 09/550,288

(22) Filed: Apr. 14, 2000

(30) Foreign Application Priority Data

Feb. 8, 2000 (SE) .............................................. 0000388
Mar. 21, 2000 (SE) .............................................. 0000957

(51) Int. Cl.[7] .............................................. G01T 1/185
(52) U.S. Cl. ..................... 250/385.1; 250/374; 250/386
(58) Field of Search .......................... 250/385.1, 385.2, 250/374, 375, 386, 387

(56) References Cited

U.S. PATENT DOCUMENTS

| | | | |
|---|---|---|---|
| 4,260,895 A | 4/1981 | Schittenhelm | 250/445 T |
| 4,461,953 A | 7/1984 | Allemand et al. | 250/374 |
| 5,521,956 A | 5/1996 | Charpak | 378/146 |
| 6,118,125 A | * 9/2000 | Carlson et al. | 250/385.1 |
| 6,133,575 A | * 10/2000 | Charpak et al. | 250/385.1 |
| 6,337,482 B1 | * 1/2002 | Franche | 250/385.1 |

FOREIGN PATENT DOCUMENTS

| | | |
|---|---|---|
| NL | 7703944 | 4/1997 |
| WO | WO 9923859 | 5/1999 |

* cited by examiner

*Primary Examiner*—Huy Mai
(74) *Attorney, Agent, or Firm*—Birch, Stewart, Kolasch & Birch, LLP

(57) ABSTRACT

A detector for detection of ionizing radiation comprises a chamber (13) filled with an ionizable gas, and including a first (17, 19) and a second (21) electrode arrangement between which a first voltage ($U_1$, $U_2$) is applicable, a radiation entrance (33) arranged such that radiation (1) can enter the chamber between and substantially in parallel with the first and second electrode arrangements, for ionization of the ionizable gas, an electron avalanche amplification arrangement (15) including an avalanche cathode arrangement (25) and an avalanche anode arrangement (27), between which a second voltage ($U_a$) is applicable, and a read-out arrangement (29), wherein the first voltage is applicable for drifting electrons created during ionization towards the electron avalanche amplification arrangement, the second voltage is applicable for avalanche amplification of said electrons, and the read-out arrangement is arranged for detection of the electron avalanches and/or correspondingly produced ions. The invention comprises that the chamber is arranged such that radiation entering through the radiation entrance will firstly enter a first chamber section having a first distance ($d_1$) between the first and second electrode arrangements and then enter a second chamber section having a second distance ($d_2$) between the first and second electrode arrangements, the first ($d_1$) and second ($d_2$) distances being substantially different, and that the read-out arrangement is arranged such that electron avalanches, and/or correspondingly produced ions, derivable mainly from ionization in the respective chamber section are separately detectable.

39 Claims, 4 Drawing Sheets

DETECTOR AND METHOD FOR DETECTION OF IONIZING RADIATION

TECHNICAL FIELD OF THE INVENTION

The present invention generally relates to the detection of ionizing radiation, and particularly to the detection of X-rays.

More specifically, the invention relates to a detector for detection of ionizing radiation, to a device for use in planar beam radiography, and to a method for detection of ionizing radiation.

DESCRIPTION OF RELATED ART AND BACKGROUND OF THE INVENTION

Gaseous detectors, in general, are very attractive at photon energies lower than approximately 10 keV. The main advantages of gaseous detectors are that they are cheap to manufacture compared to solid state detectors, and that they can employ gas multiplication to strongly (on orders of magnitude) amplify the signal amplitudes. However, at energies exceeding 10 keV the gaseous detectors are less attractive as the stopping power of the gas decreases rapidly with increased photon energy. This results in a heavily deteriorated spatial resolution due to extended tracks of so-called long-range electrons, which are created as a result of the X-ray absorption.

An improved spatial resolution is achieved by a gaseous detector for use in planar beam radiography, in which electrons released by interactions between photons and gas atoms can be extracted in a direction essentially perpendicular to the incident radiation. A detector of such a kind is described in our copending international application No. PCT/SE98/01873 entitled A method and a device for planar beam radiography and a radiation detector and filed on Oct. 19, 1998. Another detector is depicted in the U.S. Pat. No. 5,521,956 issued to Charpak.

When designing a detector for photons of lower energies and using X-rays irradiation of an energy range that includes both lower and higher energies, the higher energy photons will only to a lesser degree be absorbed in the detector due to the relatively short length of the detector.

In some situations, however, it is desirable to also detect high-energy photons as these can carry information that is distinct from that of lower energy photons. For instance, in the field of radiology the absorption coefficients for bone and tissue, respectively, vary quite differently with photon energy.

SUMMARY OF THE INVENTION

Accordingly, it is an object of the present invention to provide a detector for detection of ionizing radiation, which employs avalanche amplification, and can operate in a wider energy range, particularly also at higher energies, of incoming radiation than prior art detectors.

It is in this respect a particular object of the invention to provide such a detector that provides for an improved spatial resolution and particularly for an improved energy resolution.

A further object of the present invention is to provide a detector for detection of ionizing radiation, which is effective, fast, accurate, reliable, easy to install and use, and of low cost.

Still a further object of the invention is to provide a detector for detection of ionizing radiation, which is sensitive and can thus operate at very low X-ray fluxes.

Yet a further object of the invention is to provide a detector for detection of ionizing radiation, which can be given a length, in the direction of the incoming radiation, for achieving a desired stopping power, which makes it possible to detect a major portion of the incoming radiation.

Still a further object of the invention is to provide a detector for detection of ionizing radiation, in which electrons released by interactions between photons and gas atoms, can be extracted in a direction essentially perpendicular to the incident radiation. Hereby it is possible to obtain a particularly high spatial resolution.

Yet a further object of the invention is to provide a detector for detection of ionizing radiation, which can operate at high X-ray fluxes without performance degradation and has a long lifetime.

Still a further object of the invention is-to provide a detector for detection of any kind of ionizing radiation, including electromagnetic radiation as well as incident particles, including elementary particles.

These objects among others are, according to a first aspect of the invention, attained by a detector as claimed in Claim 1, and, according to a second aspect of the invention, attained by a detector as claimed in Claim 26.

It is a further object of the present invention to provide a device for use in planar beam radiography, e.g. slit or scan radiography, comprising at least one detector according to the first aspect of the invention.

It is in this respect a particular object of the present invention to provide such a device that can be operated such that an object to be imaged only needs to be irradiated with a low dose of X-ray photons, while an image of high quality is obtained.

Still a further object of the invention is to provide a device for use in planar beam radiography, in which a major fraction of the X-ray photons incident on the detector can be detected, for further counting or integration in order to obtain a value for each pixel of the image.

Yet a further object of the invention is to provide a device for use in planar beam radiography, in which image noise caused by radiation scattered in an object to be examined, is strongly reduced.

Still a further object of the invention is to provide a device for use in planar beam radiography, in which image noise caused by the spread of X-ray energy spectrum is reduced.

Yet a further object of the present invention is to provide a device for use in planar beam radiography, which can operate at high X-ray fluxes without performance degradation and has a long lifetime.

These objects among others are, according to a third aspect of the invention, attained by a device as claimed in Claim 18, and, according to a fourth aspect of the invention, attained by a device as claimed in Claim 36.

It is a further object of the present invention to provide a method for detection of ionizing radiation, which employs avalanche amplification and is efficient in a wider energy range, particularly also at higher energies, of incoming radiation than prior art methods.

It is in this respect a particular object of the invention to provide such a method that provides both for an improved spatial resolution and for an improved energy resolution.

A further object of the present invention is to provide a method for detection of ionizing radiation, which is effective, fast, accurate, reliable, easy to perform, and which can be implemented in a simple and cost effective way.

Still a further object of the invention is to provide a method for detection of ionizing radiation, which is sensitive and can thus operate at very low X-ray fluxes.

Yet a further object of the invention is to provide a method for detection of ionizing radiation, which detects a major portion of the incoming radiation.

Still a further object of the invention is to provide a method for detection of ionizing radiation, in which electrons released by interactions between photons and gas atoms, can be extracted in a direction essentially perpendicular to the incident radiation. Hereby it is possible to obtain a particularly high spatial resolution.

Yet a further object of the invention is to provide a method for detection of ionizing radiation, which can be performed using high X-ray fluxes.

Still a further object of the invention is to provide a method for detection of any kind of ionizing radiation, including electromagnetic radiation as well as incident particles, including elementary particles.

These and other objects are, according to a fifth aspect of the present invention, attained by a method as claimed in Claim 22, and, according to a sixth aspect of the invention, attained by a method as claimed in Claim 37.

Further characteristics of the invention and advantages thereof will be evident from the following detailed description of preferred embodiments of the invention, which are shown in the accompanying drawings.

BRIEF DESCRIPTION OF THE DRAWINGS

The present invention will become more fully understood from the detailed description of embodiments of the present invention given hereinbelow and the accompanying FIGS. 1–7, which are given by way of illustration only, and thus are not limitative of the invention.

DETAILED DESCRIPTION OF PREFERRED EMBODIMENTS

In the following description, for purposes of explanation and not limitation, specific details are set fourth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
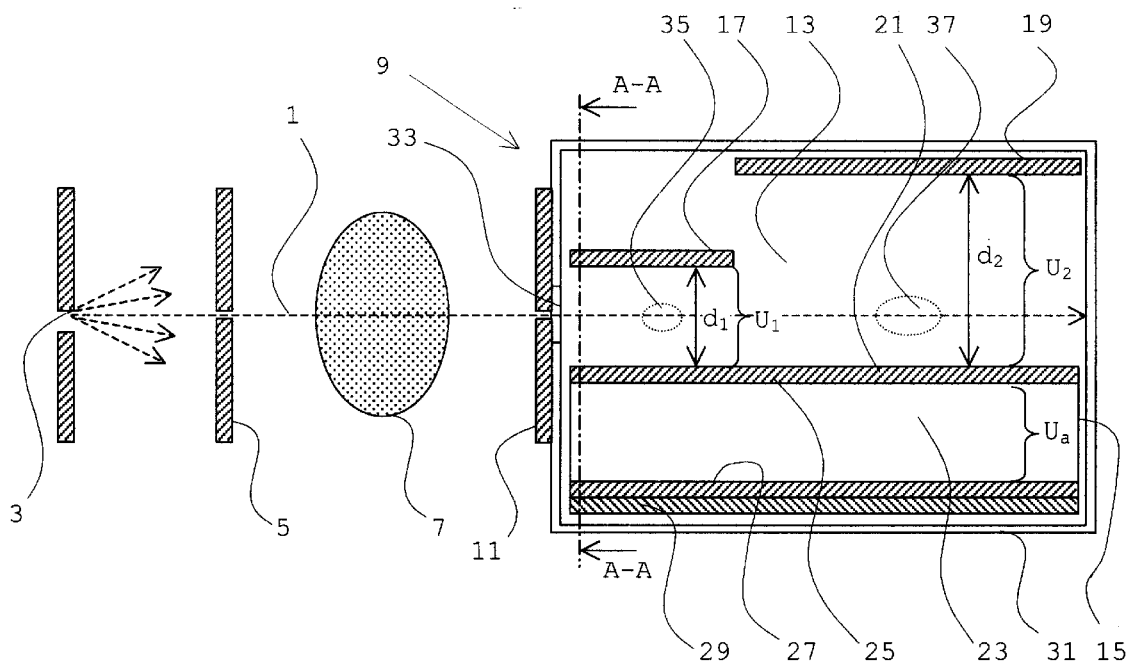
FIG. 1 illustrates schematically, in a cross sectional view, a device for planar beam radiography, according to an embodiment of the invention.

FIG. 1 is a sectional view in a plane orthogonal to the plane of a planar X-ray beam 1 of a device for planar beam radiography, according to an embodiment of the present invention. The device includes an X-ray source 3, which together with a first thin collimator window 5 produces the planar fan-shaped X-ray beam 1, for irradiation of an object 7 to be imaged. The first thin collimator window 5 can be replaced by other means for forming an essentially planar X-ray beam, such as an X-ray diffraction mirror or an X-ray lens etc.

The beam transmitted through the object 7 enters a detector 9. Optionally a thin slit or second collimator window 11, which is aligned with the X-ray beam, forms the entrance for the X-ray beam 1 to the detector 9.

A major fraction of the incident X-ray photons are detected in the detector 9, which includes a chamber 13, an arrangement for electron avalanche amplification 15, and a read-out arrangement 29. The detector 9 is oriented such that the X-ray photons enter sideways between a first 17, 19 and a second 21 electrode arrangement between which a voltage $U_1$, $U_2$, i.e. an electric field, for drift of electrons and ions in the chamber 13, is applied.

The first drift electrode arrangement 17, 19, is comprised of a first 17 and a second 19 cathode plate, respectively, and the second drift electrode arrangement is comprised of an anode plate 21. Voltage $U_1$ is applied between cathode plate 17 and anode plate 21, and voltage $U_2$ is applied between cathode plate 19 and anode plate 21. $U_1$ and $U_2$ may be equal, but $U_2$ is preferably larger than $U_1$, in order to create an electric field of constant amplitude in chamber 13. The electrode arrangements are preferably mutually substantially parallel and separated by a short distance $d_1$, in a first section of chamber 13, i.e. between cathode plate 17 and anode plate 21, and by a longer distance $d_2$ in a second section of chamber 13, i.e. between cathode plate 19 and anode plate 21. This will be discussed further below.

Chamber 13 is a conversion and drift volume and is filled with an ionizable gas. The radiation entered into chamber 13 ionizes the gas and the electrical field created by $U_1$ and $U_2$ results in a drift field in region 13 causing drift of electrons towards anode plate 21, and thus towards avalanche amplification arrangement 15, and drift of ions towards cathode plates 17 and 19.

Chamber 13 is filled with a gas, which can be a mixture of for example 90% krypton and 10% carbon dioxide or a mixture of for example 80% xenon and 20% carbon dioxide. The gas can be under pressure, preferably in a range 1–20 atm. Therefore, the detector includes a gas tight housing 31 with a slit entrance window 33, through which the X-ray beam 1 enters the detector. The window is made of a material, which is transparent to the radiation, e.g. Mylar®, or a thin aluminum foil. This is a particularly advantageous additional effect of the invention, detecting sideways incident beams in a gaseous avalanche detector 9, compared to previously used gaseous avalanche chambers, which were designed for radiation incident perpendicular to the anode and cathode plates, requiring a window covering a large area. The window can in this way be made thinner, thus reducing the number of X-ray photons absorbed in the window.

In operation, the incident X-rays 1 enter the detector through the optional thin slit or collimator window 11, if present, and between cathode plate 17 and anode plate 21, preferably in a center plane between these as indicated in FIG. 1. The incident X-rays 1 then travel through the gas volume in a direction preferably substantially parallel with electrode plates 17, 19, and 21 and get absorbed, thus ionizing gas molecules in chamber 13.

The electron avalanche amplification arrangement 15 is arranged such that the released electrons will drift towards and enter an electron avalanche amplification volume 23 of amplification arrangement 15, preferably through an avalanche cathode arrangement 25, and wherein they will be multiplied by means of a voltage $U_a$ being applied between said avalanche cathode arrangement 25 and an avalanche anode arrangement 27.

Voltage $U_a$ is applied between the avalanche cathode and the avalanche anode such that electrons from chamber 13 passing avalanche cathode 23 is accelerated towards avalanche anode 27, resulting in electron multiplication and thus multiple avalanche electrons reach avalanche anode 27. In connection with the avalanche anode 27 a read-out arrangement 29 is provided for detection of a pulse induced by the electron avalanches. In such manner single-photon detection may be realized.

Figure 6:
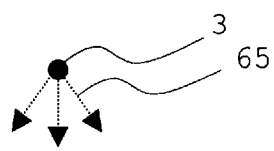
FIG. 6 is a schematic view of an embodiment of an X-ray source and an electrode formed by segmented read-out strips in accordance with the present invention.
Figure 6:
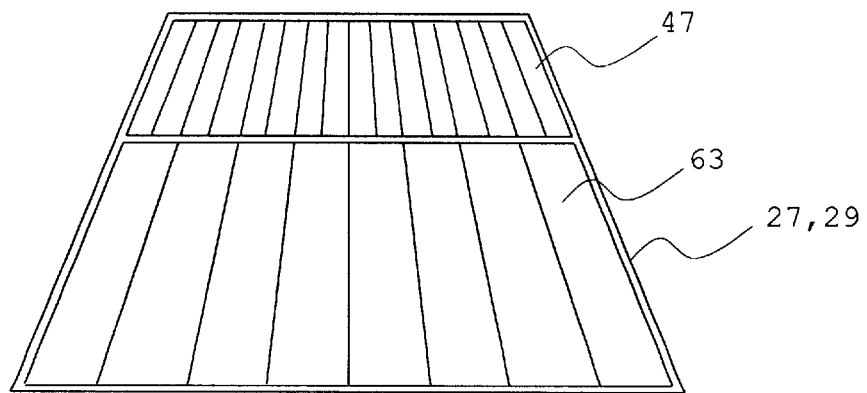

Preferably, the read-out arrangement 29 also constitutes the avalanche anode electrode 27 and hence arrangements 29, 27 are integrated into a single element. Alternatively, the read-out arrangement 29 can be formed in connection with other parts of electron avalanche amplification arrangement 15 or in connection with the drift cathode plates 17, 19. It can also be formed separated from the anode or cathode arrangements by a dielectric layer or substrate (not shown in FIG. 1). In such a case it is necessary that the anode or cathode arrangements is semi-transparent to induced pulses, e.g. formed as strips or pads. With reference to FIG. 6 different possible read-out arrangements 15 are further discussed.

The X-ray source 3, the first thin collimator window 5, the optional collimator window 11 and the detector 9 are connected and fixed in relation to each other by a suitable arrangement for example a frame or support (not shown in FIG. 1).

The so formed device for radiography can be moved as a unit to scan an object, which is to be examined. In a single detector system, as shown in FIG. 1, the scanning can be done by a pivoting movement, rotating the unit around an axis through for example the X-ray source 3 or the detector 9. The location of the axis depends on the application or use of the device, and possibly the axis can also run through the object 7, in some applications. It can also be done in a translative movement where the detector and the collimator are moved, or the object to be imaged is moved. In a multiline configuration, where a number of detectors are stacked, as will be explained later, in connection with FIG. 7, the scanning can be performed in various ways. In many cases it can be advantageous if the device for radiography is fixed and the object to be imaged is moved.

As already mentioned, the X-rays enter the detector preferably in a direction parallel to cathode plate 17 and anode plate 21. In this way the detector can easily be made with an interaction path long enough to allow a major fraction of the incident X-ray photons to interact and be detected. The length of detector 9 and of cathode plates 17 and 19 in a direction parallel with the incident radiation will be further discussed below.

Figure 2:
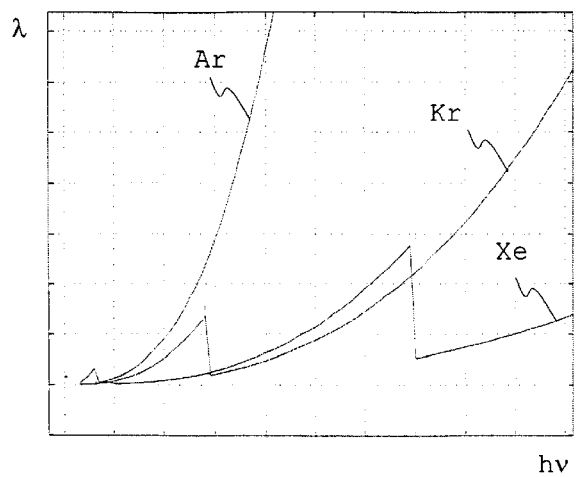
FIG. 2 is a diagram showing the mean free path of X-rays due to absorption in argon, krypton, and xenon, respectively, as a function of X-ray energy at standard temperature and pressure (STP).

When an X-ray photon hits and interacts with an atom of noble gas, a hole in the K or L shell is created, and a photoelectron having the kinetic energy $E=h\nu-E_{shell}$ is released. Where inside chamber 13 this interaction takes part is governed statistically by the absorption rate of the X-rays in the gas or gas mixture that is used. FIG. 2 is a diagram showing the mean free path $\lambda$ of X-rays due to absorption in argon, Ar, krypton, Kr, and xenon, Xe, respectively, as a function of X-ray energy hv at standard temperature and pressure (STP). In the diagram, the mean free path varies from 0 to 70 cm as the X-ray photon energy varies from 0 to 50 keV.

The detector in accordance with the present invention is particularly useful when broadband X-ray radiation is used. Hence, photoelectrons of a large range of kinetic energy are released. Electrons having lower kinetic energy are denoted short-range electrons, as such electrons have a rather short mean free path, and electrons of higher kinetic energy are correspondingly denoted long-range electrons.

Figure 3:
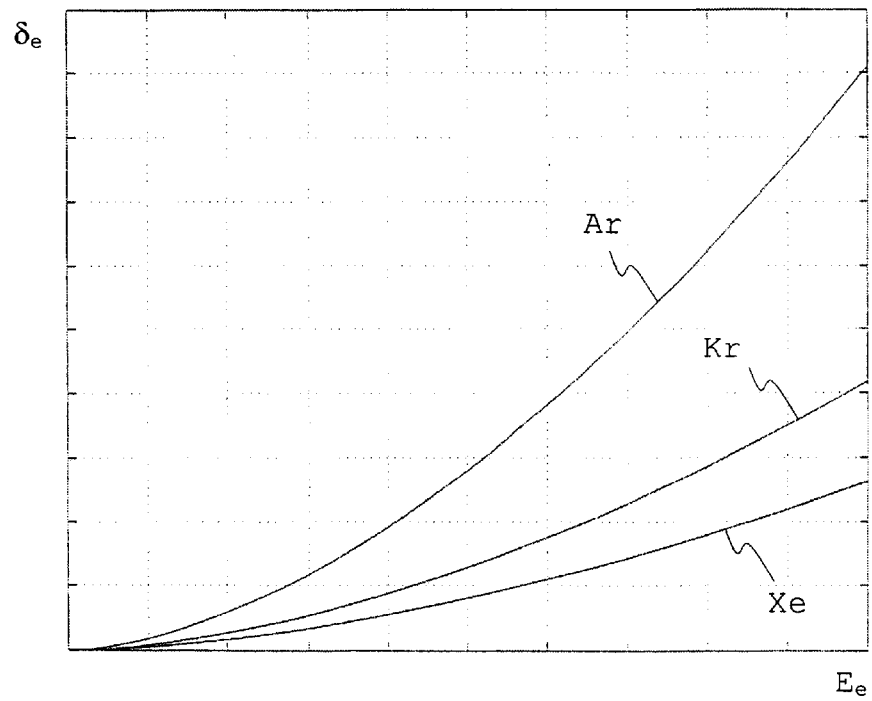
FIG. 3 is a diagram showing the practical interaction range of electrons due to scattering in argon, krypton, and xenon, respectively, as a function of electron energy at standard temperature and pressure (STP).

A long-range electron is thus an electron with high kinetic energy (up to 100 keV), which will travel a relatively long path (1–20 mm at 1 atm.) before it becomes retarded and stopped (looses its kinetic energy) in the gas. FIG. 3 is a diagram showing the practical interaction range $\delta^e$ of electrons due to scattering in argon, Ar, krypton, Kr, and xenon, Xe, respectively, as a function of electron energy $E_e$ at standard temperature and pressure (STP) . In the diagram, the interaction length of the electrons varies from 0 to 5 cm as the electron energy varies from 0 to 50 keV.

When the hole in the K or L shell is filled by an electron from a higher level, an Auger electron and/or a fluorescent (X-ray) photon will appear. An Auger electron is a short-range electron.

A short-range electron is an electron with low kinetic energy (typically 1–5 keV), which will travel a relatively short path (0.01–0.1 mm at 1 atm.) before it becomes stopped (looses its kinetic energy) in the gas or gas mixture.

Therefore, during one single interaction of an X-ray photon with a gas atom, e.g. Kr or Xe, several electrons will in many cases be released simultaneously; both long-range and short-range electrons. Further, fluorescent photons may be emitted during the interaction.

Both long-range and short-range electrons produce electron tracks of secondary ionized electrons produced by the electrons during the travel in the gas. When an electron has rather high kinetic energy (e.g. 20–30 keV), the number of released electrons (secondary ionized electrons) is low per path unit. For electrons having low kinetic energy (typically 1–4 keV) the number of released electrons (secondary ionized electrons) per path unit is higher.

As mentioned, the typical track length of a long-range electron is about 1–20 mm at atmospheric pressure. This is therefore a physical limit of the spatial resolution. The fluorescent photons emitted also create ionization, as mentioned above. This ionization takes place far away from the primary interaction with a typical attenuation length of 1.5–250 mm at atmospheric pressure. This ionization also deteriorates the spatial resolution and creates background noise.

By detecting all electrons including those released from ionization by fluorescent photons, which is done at present in all existing gas detectors, spatial resolution is drastically deteriorated at photon energies above 10 keV. All electrons are detected since the electrode gap is large.

Typically between a few hundred and thousand secondary ionization electron-ion pairs are produced from a single 20 keV X-ray photon in this process. The secondary ionization electrons (together with the primary ionization electron) will drift towards the electron avalanche amplification arrangement 15 due to the electric field in the conversion and drift volume 13. When the electrons enter regions of focused field lines of the electron avalanche amplification arrangement 15 they will undergo avalanche amplification.

The movements of the avalanche electrons and ions induce electrical signals in the read-out arrangement 29 for detection of electron avalanches. The read-out arrangement 29 is preferably arranged in vicinity of electron avalanche anode 27, but the signals may be picked up elsewhere, such as e.g. close to cathode plates 17 and 19 or at avalanche cathode 25, or at a combination of two or more of said locations. The signals are further amplified and processed by read-out circuitry (not shown in FIG. 1) to obtain accurate measurements of the X-ray photons. The read-out arrangement 29 is arranged such that electron avalanches derivable mainly from ionization in the respective chamber section (i.e. between cathode plate 17 and anode plate 21, e.g. at 35, and between cathode plate 19 and anode plate 21, e.g. at 37) are separately detectable. Hence, a detector 9 for energy resolved detection of X-rays is achieved, wherein, at least from a statistical viewpoint, X-rays of lower energies are absorbed in the first section of chamber 13 having a short distance $d_1$ between the electrode plates and X-rays of higher energies are absorbed in the second section of chamber 13 having a distance $d_2$ between the electrode plates.

The electrode distance $d_1$ in the first chamber section is preferably chosen such that detection of lower energy photons of high spatial resolution is enabled. Thus, $d_1$ shall preferably be shorter than the attenuation length of the fluorescent (X-ray) photons. This results in that a great number of fluorescent photons will not cause ionization in the conversion and drift volume.

A further improvement of the spatial resolution is achieved if the detector is provided with a first chamber section having an electrode gap distance $d_1$, which is shorter than the length of the electron tracks (i.e. the interaction length) of long-range electrons. This results in that an even larger number of fluorescent photons and a large number of long-range electrons will not undergo full energy loss in the first chamber section.

The distance $d_1$ may preferably be selected such that a major portion of the fluorescent photons and/or long-range electrons is discriminated. That is, a major portion of the fluorescent photons will not cause ionization in the conversion and drift gap and/or a major portion of the long-range electrons will not be retarded to the energy level where they produce a high number of secondary ionized electrons per path unit within the first chamber section.

Still a further improvement of the spatial resolution is achieved if the detector is provided with a first chamber section having an electrode gap distance $d_2$, which is essentially a few times the length of the electron tracks (i.e. interaction length) of short-range electrons, e.g. 1–5 times the length of the electron tracks of the short-range electrons. This results in that a larger number of fluorescent photons and a larger number of long-range electrons will not undergo full energy loss in the conversion and drift volume. Of course the distance $d_1$ can be smaller than the length of the electron tracks of the short-range electrons, but then the efficiency will go down since also short-range electrons will reach the electrode plates before complete ionization.

By such geometrical discrimination of long-range electrons and fluorescent photons it is achieved that a larger amount of the detected avalanches are caused by short-range electrons, than without the discrimination. This improves the spatial resolution since the long-range electrons and fluorescent photons cause avalanches far from the interaction position of the incident X-ray. The more long-range electrons and fluorescent photons that are discriminated, the higher the ratio between detected avalanches caused by short-range electrons and detected avalanches caused by long range electrons and fluorescent photons will be. A higher spatial resolution is hereby achieved.

The length $l_1$ of the first chamber section in the direction of the incident X-rays is arranged such that a substantial portion of the lower energy radiation is absorbed in the first chamber section.

The electrode distance $d_2$ in the second chamber section is preferably chosen such that detection of higher energy photons is enabled. Thus, $d_2$ shall preferably be substantially longer than $d_1$ in order to allow primary long-range electrons to be retarded and to ionize gas molecules, thus releasing shorter-range electrons. The efficiency of detecting higher energy photons is thus improved to the cost of a deteriorated spatial resolution.

Preferably though, the electrode distance $d_2$ in the second chamber section is shorter than the attenuation length of the fluorescent (x-ray) photons. This results in that a great number of fluorescent photons will not cause ionization in the conversion and drift volume.

A further improvement of the spatial resolution is achieved if the detector is provided with a second chamber section having an electrode gap distance $d_2$, which is essentially a few times the length of the electron tracks (i.e. interaction length) of long-range electrons, e.g. 1–5 times the length of the electron tracks of the long-range electrons.

The length 12 of the second chamber section in the direction of he incident X-rays is arranged such that a substantial portion of the higher energy radiation is absorbed in the second chamber section.

Certainly, the electrode distances $d_1$ and $d_2$, and the chamber section lengths $l_1$ and $l_2$ are chosen for each particular application and for each particular radiation spectrum used in order to achieve desired detection efficiency, and required spatial and energy resolution.

Also electronic discrimination can be used to improve the spatial resolution and the energy resolution. As mentioned, short-range electrons produce a high number of secondary ionized electrons per path unit, and electrons having high energy produce a low number of secondary ionized electrons per path unit. Therefore the avalanche-amplified pulses at the read-out arrangement are high and/or wide for short-range electrons, while they are small for a long-range electron in the first chamber section. By providing the read out electronics with a threshold function as regards some suitable signal derived parameter, e.g. amplitude or integrated value, the pulses from the long-range electrons in the first chamber section can be electronically discriminated and hence both the spatial resolution and the energy resolution are further improved.

Similarly, in the second chamber section, the high-energy electrons are allowed to be fully retarded, and hence in total a larger number of electrons are released from such electrons than from short-range electrons and therefore the detected avalanche amplified pulses are higher and/or wider for longer-range electrons than for shorter-range electrons. Thus, as higher-energy photons produce longer-range electrons the energy resolution in the second chamber section may be further improved by electronically discriminating pulses having a signal-derived parameter, e.g. amplitude or integrated value, below a certain threshold value.

In yet another embodiment of the present invention the first and second chamber sections are separated in a fluid-tight, but radiation permeable, manner (not shown in FIG. 1) and each chamber is individually filled with an ionizable gas of a predetermined pressure. The chamber sections may be separated by a fluid-tight wall in which a suitable radiation transparent window is arranged (similar to window 33), through which window the X-ray beam 1 enters the second chamber section. By controlling the content of the gas mixture and the gas pressure in each chamber individually a further improved energy and spatial resolution may be achieved.

Figure 4:
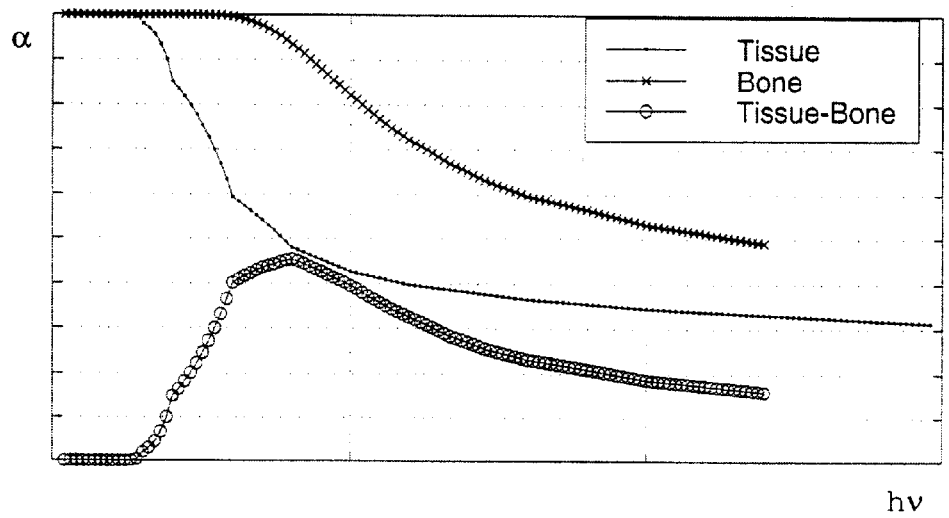
FIG. 4 is a diagram showing the absorption coefficient of X-rays due to absorption in tissue and bone, respectively, of human body as a function of X-ray energy.

With reference now to FIG. 4 a particular embodiment of the present invention is to be described, wherein it can be used to measure the bone mineral density of humans. FIG. 4 is a diagram showing the absorption coefficient α of X-rays due to absorption in tissue, and in bone, respectively, of human body as a function of X-ray energy. In the diagram, the absorption coefficient varies from 1 to roughly 0.4 as the X-ray photon energy varies from 0 to 150 keV. Shown is also the differential absorption coefficient (indicated Tissue-Bone), which is an indication of the absorption selectivity between tissue and bone, as a function of the photon energy.

Normally the bone is surrounded by an unknown amount of tissue. One commonly used method to estimate the amount of bone is to detect transmitted X-rays at two different X-ray energies. One exposure is made at X-ray energies where bone and tissue absorb X-rays very differently; typically at 40 keV where the differential absorption coefficient has a maximum, see FIG. 4. Another exposure is made at energies where bone and tissue absorb X-rays in a similar way; typically at energies above 100 keV, see FIG. 4 again. From these two measurements the amount of bone is estimated. However, this requires that the detector is capable of detecting low energy (around 40 keV) X-rays as well as high energy X-rays (>100 keV), which is often a problem. Furthermore, to obtain beams with a narrow energy distribution at low energy, the incoming X-ray flux, which has a broad spectrum, needs to be heavily filtered, putting a large load on the X-ray tube. The two separate exposures, taken at different times, also give rise to problems due to movements of the object between the two exposures.

The present invention describes a detector and a method that can measure X-rays over a wide energy range. Low energy X-rays are preferably detected in the first, thin chamber section of the detector due to their short absorption length. High energy X-rays mainly traverse the first chamber section of the detector and are detected in the second, thicker chamber section. The invention allows the same detector to be used to efficiently detect X-rays at rather different energies with the same detector, using the commonly used double exposure method.

Alternatively, the two measurements can be made simultaneously using a broad X-ray spectrum of the incident X-rays. This second alternative requires less filtering of the X-rays and put less load on the X-ray tube. Furthermore, by simultaneously detecting the two energy intervals problems of movements between exposures are reduced.

Figure 5:
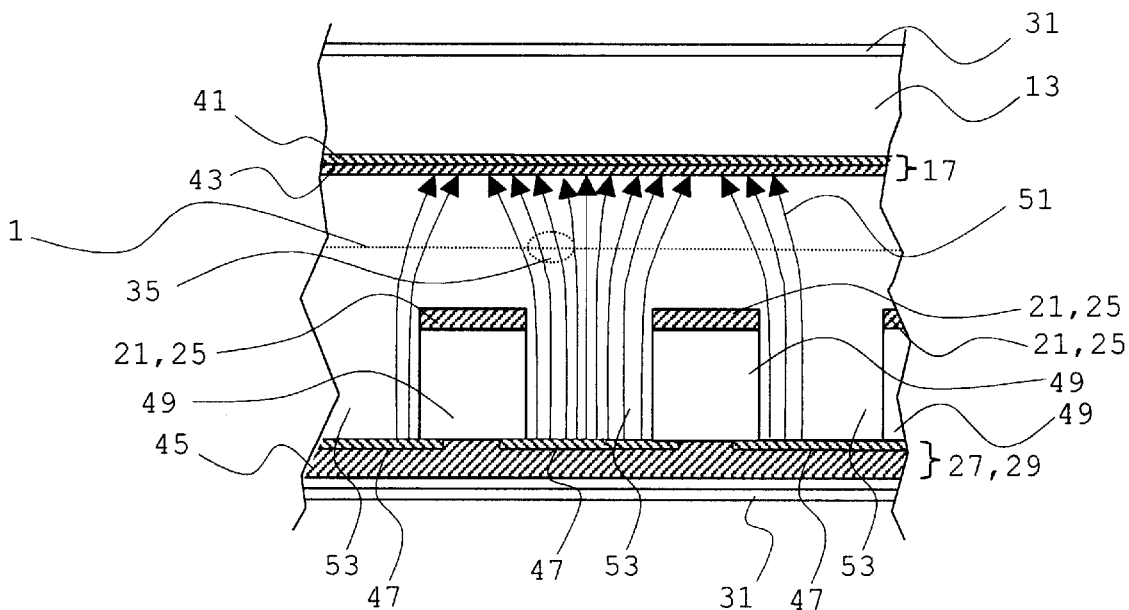
FIG. 5 is a schematic, partly enlarged, cross sectional view of a particular embodiment of the invention, taken along A—A of FIG. 1.

FIG. 5 shows a schematic, partly enlarged, cross sectional view of a particular embodiment of the invention, taken along A—A of FIG. 1, and shows particularly the avalanche amplification arrangement in more detail. It shall, however, be appreciated that the present invention is not limited to such a design. Other possible avalanche amplification arrangement designs are further elaborated in our copending Swedish patent application No. 9901325-2 entitled Radiation detector, an apparatus for use in planar radiography and a method for detecting ionizing radiation and filed on Apr. 14, 1999, which application hereby is incorporated by reference. It shall also be appreciated that the avalanche amplification arrangement may be a solid-state device or comprise a liquid amplification region.

The first electrode arrangement 17 comprises a dielectric substrate 41 and a conductive layer 43 being a cathode electrode, and the second electrode arrangement 21 being the same arrangement as the avalanche cathode 25. The avalanche anode 27 comprises a dielectric substrate 45 and conductive layer strips 47.

A dielectric 49 is arranged between the avalanche cathode 25 and the avalanche anode 27. This could be a gas or a solid substrate 49 carrying the cathode 25 and the anode 27, as shown in the Figure. A first voltage is applied between arrangement 17 and arrangement 21, 25 by means of a DC power supply (not shown in FIG. 5) and a second voltage is applied between cathode 25 and anode 27 such that an electric field 51 is achieved, which is very strong in gas-filled avalanche amplification regions 53. The avalanche regions 53 are formed in a region between and around the edges of the avalanche cathode 25 which are facing each other, and between the avalanche cathode 25 and the avalanche anode 27, where a concentrated electric field will occur due to the applied voltages.

The voltages applied are selected so that a weaker electric field, drift field, is created over the first section of chamber 13. Electrons (primary and secondary electrons) released by interaction, e.g. at 35, will drift, due to the drift field, towards the avalanche amplification arrangement. They will enter the very strong avalanche amplification field and be accelerated. The accelerated electrons will interact with other gas atoms in one of regions 53, causing further electron-ion pairs to be produced. Those produced electrons will also be accelerated in the field, and will interact with new gas atoms, causing further electron-ion pairs to be produced. This process continues during the travel of the electrons in the avalanche region towards the anode 27 and an electron avalanche is formed.

The avalanche regions 53 are formed by openings or channels in cathode 25 and the dielectric substrate 49, if present. The openings or channels can be of arbitrary shape, e.g. circular or square, as seen from above, or continuous, longitudinal extending between two edges of the substrate 49, if present, and cathode 25. In the case the openings or channels are circular when seen from above they are arranged in rows, each row of openings or channels including a plurality of circular openings or channels. A plurality of longitudinal openings or channels or rows of channels are formed beside each other, parallel with each other or with the incident X-rays. Alternatively, the openings or channels can be arranged in other patterns.

Conductive layer strips 47 also form read-out elements of read-out arrangement 29. The strips are arranged in connection with the openings or channels forming the avalanche regions 53. Preferably one strip is provided for each opening or channel or row of openings or channels. The strips could be divided into sections along its length, where one section could be provided for each opening or channel or for a plurality of openings or channels, in the form of pads, see further discussion below. The strips and the sections, if present, are electrically insulated from each other. Each detector electrode element i.e. strip or section is preferably separately connected to processing electronics (not shown in FIG. 5).

By providing a plurality of readout strips 47 as shown in FIG. 5 a detector 9 is achieved, wherein electron avalanches derivable mainly from ionization by transversely separated portions of the planar radiation beam are separately detectable. Hereby, one-dimensional imaging may be performed using detector 9.

Alternatively the read-out elements can be located on the backside of the substrate. In this case it is necessary that the anode electrodes 4, 19 are semi-transparent to induced pulses. In connection with FIG. 6 below different possible arrangements of read-out elements are shown.

As an example, the longitudinal channels can have a width in the range 0.01–1 mm, the channels can have a width in the range 0.01–1 mm, and the thickness of the dielectric 49 (separation between avalanche cathode 25 and anode 27) is in the range 0.01–1 mm.

Alternatively, conductive layers 43 and 47 can be replaced by a resistive carrier of e.g. silicon, conductive glass or diamond, and dielectric substrates 41 and 45 can be replaced by conductive layers.

A cross-sectional view taken parallel with A—A in FIG. 1, but in the second section of chamber 13 would be identical to the one shown in FIG. 5, except of that the gap constituting chamber 13 would be considerably larger. By providing separate readout strips beneath the respective sections of chamber 13 a detector 9 is achieved, wherein electron avalanches derivable mainly from ionization by X-rays of different energy are separately detectable.

In the embodiment described above particular locations of the detector anode and cathode arrangements have been described. There are, however, a plurality of other locations that are equally well suitable in connection with the present invention.

Referring now to FIG. 6, a possible configuration of an avalanche anode arrangement 27 (and read-out arrangement 29) is shown. The arrangement is formed by conductive strips 47 and 63.

A plurality of strips 47 are placed side by side and a plurality of strips 63 are placed side by side, the strips 47, 63 extending in directions parallel to the direction of incident X-ray photons 65, originating from source 3, at each location. Preferably, strips 47 are arranged beneath the first section chamber and strips 63 are arranged beneath the second chamber section. The strips are formed on a substrate, electrically insulated from each other, by leaving a space between them (not shown in FIG. 6). The strips may be formed by photolithographic methods or electroforming, etc.

The space and the width of the strips 47 are adjusted to the specific detector in order to obtain the desired (optimal) spatial resolution. Thus, strips 63 are wider than strips 47, as the spatial resolution achievable anyhow is worse for the higher-energy X-rays.

The strips 47 should be placed under the openings or channels or rows of openings or channels as shown in FIG. 5. Similarly, strips 63 should be placed under corresponding openings or channels or rows of openings or channels formed in the avalanche amplification arrangement beneath the second chamber section.

Each of the strips 47, 63 is connected to the processing electronics (not shown in FIG. 6) by means of a separate signal conductor, where the signals from each strip preferably are processed separately. If anode or cathode strips constitute the detector strips, the signal conductors also connect the respective strip to the high voltage DC power supply, with suitable couplings for separation.

As indicated in FIG. 6, the strips 47, 63 are aiming at the X-ray source 3, which provides compensation for parallax errors in detected images.

In the case the read-out arrangement 29 is a separate arrangement, the anode electrode 27 can be formed as a unitary electrode without strips and spacings.

An alternative configuration of a read-out arrangement (not illustrated) has the strips 47 and/or 63 further divided into segments in the direction of the incident X-rays, the segments being electrically insulated from each other. Preferably a small spacing extending perpendicular to the incident X-rays is provided between each segment of respective strip. Each segment is connected to the processing electronics by means of a separate signal conductor, where the signals from each segment preferably are processed separately.

This read-out arrangement can be used when further energy-resolved detection of the X-rays is required. By statistical methods one can restore the spectrum of the incident photons with good energy resolution. See for example E. L. Kosarev et al., Nucl. Instr and methods, 208 (1983) 637, and G. F. Karabadjak et al., Nucl. Instr and methods, 217 (1983) 56.

Generally for all embodiments, each incident X-ray photon causes one induced pulse in one (or more) detector electrode element. The pulses are processed in the processing electronics, which eventually shapes the pulses, and integrates or counts the pulses from each strip (pad or sets of pads) representing one picture element. The pulses can also be processed so as to provide an energy measure for each pixel.

Where the detector electrode is on the cathode side, the area of an induced signal is broader (in a direction perpendicular to the direction of incidence of the X-ray photons) than on the anode side. Therefore, weighing of the signals in the processing electronics is preferable.

Figure 7:
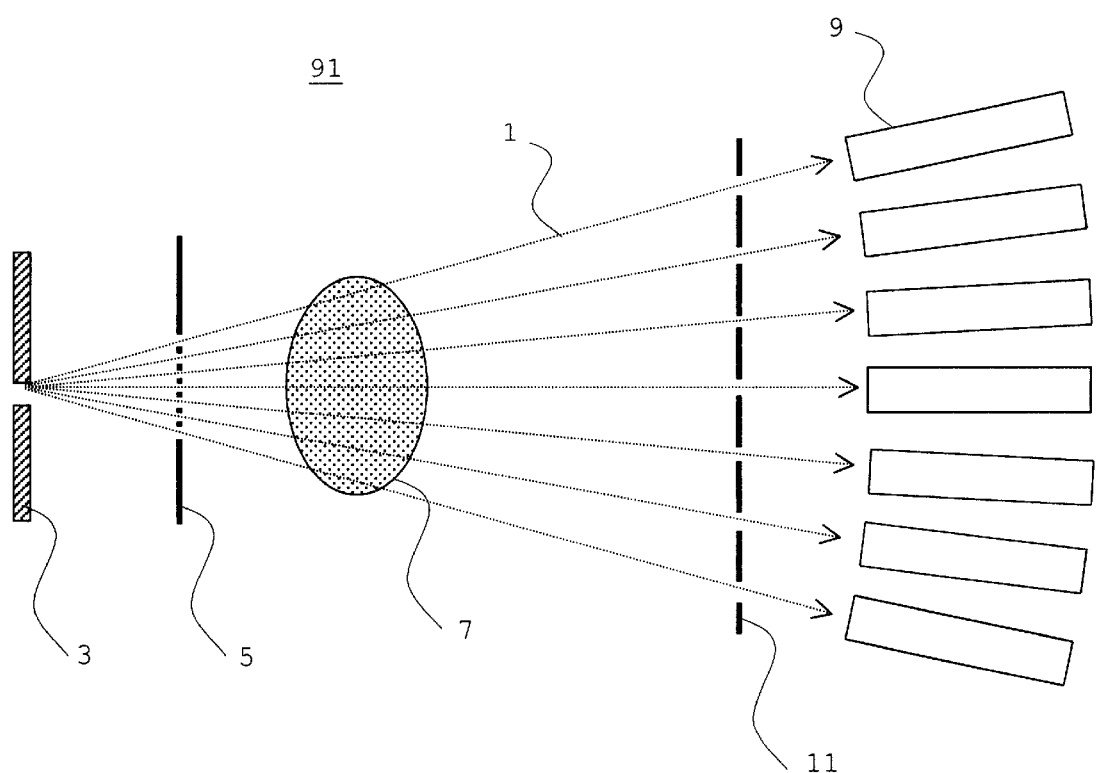
FIG. 7 is a schematic cross sectional view of a device with stacked detectors for use in planar beam radiography according to a further embodiment the invention.

FIG. 7 shows schematically a device 91 according to an embodiment of the present invention having a plurality of the inventive detectors 9 stacked, side-by-side of each other. By this embodiment multiline scan can be achieved, which reduces the overall scanning distance, as well as the scanning time. The device of this embodiment includes an X-ray source 3, which together with a number of collimator windows 5 produce a number of planar fan-shaped X-ray beams 1, for irradiation of the object 7 to be imaged. The beams transmitted through the object 7 optionally enter the individual stacked detectors 9 through a number of second collimator windows 11, which are aligned with the X-ray beams. The first collimator windows 5 are arranged in a first rigid structure (not shown in FIG. 7), and the optional second collimator windows 11 are arranged in a second rigid structure (not shown in FIG. 7) attached to the detectors 9, or arranged separately on the detectors.

The X-ray source 3, the first rigid structure, and the possible second rigid structure including collimator windows 11, respectively, and the stacked detectors 9, which are fixed to each other, are connected and fixed in relation to each other by some suitable arrangement, e.g. a frame or support (not shown in FIG. 7). The so formed device for radiography can be moved as a unit to scan an object, which is to be examined. In this multiline configuration, the scanning can be done in a transverse movement, perpendicular to the X-ray beam, as mentioned above. It can also be advantageous if the device for radiography is fixed and the object to be imaged is moved. Alternatively, the collimator and the detector can be moved synchronously by a commonly controlled motor.

A further advantage of using a stacked configuration, compared to large single volume gas detectors, is reduction of background noise caused by X-ray photons scattered in the object 7. These scattered X-ray photons travelling in directions not parallel to the incident X-ray beam could cause "false" signals or avalanches in one of the other detectors 9 in the stack, if passing through anode and cathode plates and entering such a chamber. This reduction is achieved by significant absorption of (scattered) X-ray photons in the material of the anode and the cathode plates, or the collimator 11.

This background noise can be further reduced by providing thin absorber plates (not illustrated) between the stacked detectors. These absorber plates or sheets can be made of a high atomic number material, for example tungsten.

It is general for all embodiments that the gas volumes are very thin, which results in a fast removal of ions, which leads to low or no accumulation of space charges. This makes operation at high rate possible.

It is also general for all embodiments that the small distances leads to low operating voltages, which results in low energy in possible sparks, which is favorable for the electronics.

The focusing of the field lines in the embodiments is also favorable for suppressing streamer formations. This leads to a reduced risk for sparks.

As an alternative for all embodiments, the electric field in the conversion and drift gap (volume) can be kept high enough to cause electron avalanches, hence to be used in a pre-amplification mode.

As a further alternative, the electrode arrangement 21, 25 may be dispensed with, and an electric field between electrode arrangement 17, 19 and cathode arrangement 27 can be kept high enough to cause electron avalanche amplification within the complete volume as defined by regions 13 and 23, 53.

Further, all electrode surfaces may be covered by a resistive material in order to decrease the risk for occurrence of sparks, which will influence the measurement and may destroy electronic equipment of the detector. Such resistive layers are further described in our copending Swedish patent application No. 9901327-8 entitled Radiation detector and an apparatus for use in radiography and filed on Apr. 14, 1999. The application is hereby incorporated by reference.

It will be obvious that the invention may be varied in a plurality of ways. For example, the voltages can be applied in other ways as long as the described electrical fields are created.

Such variations are not to be regarded as a departure from the scope of the invention. All such modifications as would be obvious to one skilled in the art are intended to be included within the scope of the appended claims.

What is claimed is:

1. A detector for detection of ionizing radiation, comprising:
    a chamber filed with an ionizable gas, and including a first and a second electrode arrangement, substantially in parallel with each other, between which a first voltage is applicable;
    a radiation entrance arranged such that radiation can enter the chamber between and substantially in parallel with the first and second electrode arrangements, for ionization of the ionizable gas;
    an electron avalanche amplification arrangement including an avalanche cathode arrangement and an avalanche anode arrangement, between which a second voltage is applicable; and
    a read-out arrangement; wherein
    the first voltage is applicable for drifting electrons created during ionization towards the electron avalanche amplification arrangement, the second voltage is applicable for avalanche amplification of said electrons, and the read-out arrangement is arranged for detection of electron avalanches and/or correspondingly produced ions;
    the chamber is arranged such that radiation entering through the radiation entrance enters a first chamber section having a first distance between the first and second electrode arrangements and then enters a second chamber section having a second distance between the first and second electrode arrangements, the first and second distances being different; and
    the read-out arrangement is arranged such that electron avalanches, and/or correspondingly produced ions, derivable mainly from ionization in the respective chamber section are separately detectable.

2. The detector as claimed in claim 1, wherein the first distance is shorter than the attenuation length of fluorescent photons emitted in the ionizable gas subsequent to ionization.

3. The detector as claimed in claim 1, wherein the first distance is shorter than the second distance.

4. The detector as claimed in claim 1, wherein the second distance is shorter than the attenuation length of fluorescent photons emitted in the ionizable gas subsequent to ionization.

5. The detector as claimed in claim 1, wherein the radiation entrance is arranged such that radiation having a broadband energy spectrum can enter the chamber, whereby short-range electrons are released through ionization by lower energy radiation and long-range electrons are released through ionization by higher energy radiation.

6. The detector as claimed in claim 5, wherein the first distance is shorter than the interaction length of the long-range electrons.

7. The detector as claimed in claim 5, wherein the first distance is shorter than a few times the interaction length electron of the short-range electrons.

8. The detector as claimed in claim 5, wherein the second distance is shorter than a few times the interaction length electron of the long-range electrons.

9. The detector as claimed in claim 5, wherein the first and second chamber sections are separated in a fluid-tight, but radiation permeable, manner and each chamber is individually filled with an ionizable gas of a predetermined pressure.

10. The detector as claimed in claim 5, wherein the ionizable gas and the length of the respective chamber section in the direction of the incident radiation is arranged such that a substantial portion of the lower energy radiation is absorbed in the first chamber section and a substantial portion of the higher energy radiation is absorbed in the second chamber section, whereby the read-out arrangement is arranged for energy-resolved detection of the radiation.

11. The detector as claimed in claim 1, wherein the radiation entrance is arranged such that a planar radiation beam can enter the chamber, and the read-out arrangement is arranged such that electron avalanches, and/or correspondingly produced ions, derivable mainly from ionization by transversely separated portions of said planar radiation beam are separately detectable.

12. The detector as claimed in claim 1, further comprising a signal processing device arranged for discriminating a signal derivable from detected electron avalanches, and/or correspondingly produced ions, in dependence on a signal derived parameter.

13. The detector as claimed in claim 1, wherein the electron avalanche amplification arrangement comprises a plurality of avalanche regions.

14. The detector as claimed in claim 13, wherein the avalanche cathode arrangement is provided with openings.

15. The detector as claimed in claim 13, wherein the avalanche anode arrangement is provided in the form of a plurality of strips or pads.

16. The detector as claimed in claim 1, wherein the second electrode arrangement and the avalanche cathode arrangement are comprised of a single arrangement.

17. The detector as claimed in claim 1, wherein the avalanche anode arrangement and the read-out arrangement are comprised of a single arrangement.

18. A device for use in planar beam radiography, said device comprising an X-ray source, an arrangement for forming an essentially planar X-ray beam located between said X-ray source and an object to be imaged, and the detector as claimed in claim 1, located and arranged for detection of the planar X-ray beam as transmitted through said object.

19. The device as claimed in claim 18, wherein said X-ray source, said arrangement for forming an essentially planar X-ray beam and said detector are fixed in relation to each other.

20. The device as claimed in claim 18, comprising a second and a further of the detector as claimed in claim 1, which detectors are stacked to form a detector unit, and arrangement for forming an essentially planar X-ray beam for each detector, said arrangement being located between said X-ray source and said object, wherein each detector is located and arranged for detection the respective planar X-ray beam as transmitted through or reflected off said object.

21. The device as claimed in claim 20, comprising absorber plates arranged between the detectors in order to absorb scattered X-ray photons.

22. A method for detection of ionizing radiation in a detector comprising a chamber filled with an ionizable gas, and including a first and a second electrode arrangement, substantially in parallel with each other, a radiation entrance, an electron avalanche amplification arrangement including an avalanche cathode arrangement and an avalanche anode arrangement, and a read-out arrangement, said method comprising:

introducing a radiation beam into the chamber between and substantially in parallel with the first and second electrode arrangements, for ionization of the ionizable gas, such that the radiation beam is firstly introduced into a first section of the chamber having a first distance between the first and second electrode arrangements and is then introduced into a second chamber section having a second distance between the first and second electrode arrangements, the first and second distances being different;

applying a first voltage between the first and second electrode arrangements for drifting electrons created during ionization towards the electron avalanche amplification arrangement;

applying a second voltage between the avalanche cathode and avalanche anode arrangements for avalanche amplification of said electrons; and by means of the read-out arrangement separately detecting electron avalanches, and/or correspondingly produced ions, derivable mainly from ionization in the respective chamber section.

23. The method as claimed in claim 22, further comprising geometrically discriminating electrons of a predetermined kinetic energy in the chamber.

24. The method as claimed in claim 22, further comprising electronically discriminating electron avalanches, and/or correspondingly produced ions, derivable mainly from radiation of a predetermined kinetic energy.

25. The method as claimed in claim 22, further comprising introducing the radiation beam in the form a planar radiation beam into the chamber, and by means of the read-out arrangement separately detecting electron avalanches, and/or correspondingly produced ions, derivable mainly from ionization by transversely separated portions of said planar radiation beam.

26. A detector for detection of ionizing radiation comprising:

a chamber filled with an ionizable substance, and including a first and a second electrode arrangement, substantially in parallel with each other;

a radiation entrance arranged such that radiation can enter the chamber between and substantially in parallel with the first and second electrode arrangements and ionize the ionizable substance;

an electron avalanche amplification arrangement for avalanche amplification of electrons created during ionization; and a read-out arrangement for detection of the electron avalanches and/or correspondingly produced ions, wherein the chamber is arranged such that radiation entering through the radiation entrance enters a first chamber section having a first distance between the first and second electrode arrangements and then enter a second chamber section having a second distance between the first and second electrode arrangements, the first and second distances being different; and the read-out arrangement is arranged such that electron avalanches, and/or correspondingly produced ions, derivable mainly from ionization in the respective chamber section are separately detectable.

27. The detector as claimed in claim 26, wherein the first distance is shorter than the attenuation length of fluorescent photons emitted in the ionizable gas subsequent to ionization.

28. The detector as claimed in claim 26, wherein the first distance is shorter than the second distance.

29. The detector as claimed in claim 26, wherein the second distance is shorter than the attenuation length of fluorescent photons emitted in the ionizable gas subsequent to ionization.

30. The detector as claimed in claim 26, wherein the radiation entrance (33) is arranged such that radiation having a broadband energy spectrum can enter the chamber, whereby short-range electrons are released through ionization by lower energy radiation and long-range electrons are released through ionization by higher energy radiation.

31. The detector as claimed in claim 30, wherein the first distance is shorter than the interaction length of the long-range electrons.

32. The detector as claimed in claim 30, wherein the first distance is shorter than a few times the interaction length electron of the short-range electrons.

33. The detector as claimed in claim 30, wherein the second distance is shorter than a few times the interaction length electron of the long-range electrons.

34. The detector as claimed in claim 30, wherein the first and second chamber sections are separated in a fluid-tight, but radiation permeable, manner and each chamber is individually filled with an ionizable substance.

35. The detector as claim in claim 30, wherein the ionizable substance and the length of the respective chamber section in the direction of the incident X-rays are arranged such that a substantial portion of the lower energy radiation is absorbed in the first chamber section and a substantial portion of the higher energy radiation is absorbed in the second chamber section, whereby the read-out element arrangement is arranged for energy-resolved detection of the radiation.

36. A device for use in planar beam radiography comprising an X-ray source, an arrangement for forming an essentially planar X-ray beam located between said X-ray source and an object to be imaged, and the detector as claimed in claim 26 located and arranged for detection of the planar X-ray beam as transmitted through said object.

37. A method for detection of ionizing radiation in a detector comprising a chamber filled with an ionizable substance, and including a first and a second electrode arrangement, substantially in parallel with each other, a radiation entrance, an electron avalanche amplification arrangement, and a read-out arrangement, said method comprising:

introducing a radiation beam into the chamber between and substantially in parallel with the first and second electrode arrangements, for ionization of the ionizable substance, thereby firstly introducing the radiation beam into a first section of the chamber having a first distance between the first and second electrode arrangements and then introducing the radiation beam into a second chamber section having a second distance between the first and second electrode arrangements, the first and second distances being different;

avalanche amplifying the electrons created during ionization; and by means of the read-out arrangement separately detecting electron avalanches, and/or correspondingly produced ions, derivable mainly from ionization in the respective chamber section.

38. The method as claimed in claim 37, further comprising geometrically discriminating electrons of a predetermined kinetic energy in the chamber.

39. The method as claimed in claim 37, further comprising electronically discriminating electron avalanches, and/or correspondingly produced ions, derivable mainly from radiation of a predetermined kinetic energy.

* * * * *